(12) United States Patent
Virtanen

(10) Patent No.: US 8,480,018 B2
(45) Date of Patent: Jul. 9, 2013

(54) METHOD AND APPARATUS FOR THE PREPARATION OF FINELY DIVIDED CALCIUM HYDROXIDE

(75) Inventor: Pentti Virtanen, Valkeakoski (FI)

(73) Assignee: Fractivator Oy, Lempaala (FI)

( * ) Notice: Subject to any disclaimer, the term of this patent is extended or adjusted under 35 U.S.C. 154(b) by 158 days.

(21) Appl. No.: 13/123,495

(22) PCT Filed: Oct. 29, 2009

(86) PCT No.: PCT/FI2009/050868
§ 371 (c)(1),
(2), (4) Date: Apr. 8, 2011

(87) PCT Pub. No.: WO2010/055199
PCT Pub. Date: May 20, 2010

(65) Prior Publication Data
US 2011/0192921 A1  Aug. 11, 2011

(30) Foreign Application Priority Data
Nov. 14, 2008  (FI) ..................................... 20080621

(51) Int. Cl.
  *B02C 13/00* (2006.01)
  *B02C 13/20* (2006.01)
  *B02C 21/00* (2006.01)
(52) U.S. Cl.
  USPC .................. 241/186.5; 241/188.1; 241/21
(58) Field of Classification Search
  USPC ................ 241/188.1, 188.2, 21, 186.5, 186.2
  See application file for complete search history.

(56) References Cited

U.S. PATENT DOCUMENTS

| | | | |
|---|---|---|---|
| 4,813,619 A * | 3/1989 | Tjumanok et al. | 241/80 |
| 6,202,946 B1 * | 3/2001 | Virtanen | 241/21 |
| 6,451,281 B1 | 9/2002 | Ebeling et al. | 423/640 |
| 7,314,190 B2 * | 1/2008 | Palm | 241/21 |
| 7,748,653 B2 * | 7/2010 | Palm | 241/27 |
| 2004/0188480 A1 * | 9/2004 | Palm et al. | 224/321 |
| 2006/0011757 A1 * | 1/2006 | Palm | 241/27 |

FOREIGN PATENT DOCUMENTS

| | | |
|---|---|---|
| FI | 964131 | 4/1998 |
| WO | WO 99/51524 | 10/1999 |
| WO | WO 99/54045 | 10/1999 |
| WO | WO 2006/040391 | 4/2006 |

* cited by examiner

*Primary Examiner* — Faye Francis
(74) *Attorney, Agent, or Firm* — James C. Lydon

(57) ABSTRACT

Method for the preparation of finely divided calcium hydroxide, where calcium oxide is comminuted in an impact disintegrator into which in addition to the calcium hydroxide a small amount of water is led to wet the particles obtained and to bind the dust. The calcium oxide powder is led to a conveyor being in connection with the impact disintegrator and operating as a pre-quencher, to which conveyer water is added and where the material is subjected to a kneading effect. The material which is a mixture of calcium oxide and calcium hydroxide is led from the conveyor to a cistern operating as post-quencher, to which cistern the remaining portion of the total water amount required for quenching is added. The amount of water added to the impact disintegrator and to the pre-quencher is altogether 20 . . . 50% of the total amount of water required for quenching, preferably about ⅓ of the total amount of water required for quenching, and the amount of water added to the post-quencher is 80 . . . 50% of the total amount of water required for quenching, preferably about ⅔ of the total amount of water required for quenching.

7 Claims, 2 Drawing Sheets

METHOD AND APPARATUS FOR THE PREPARATION OF FINELY DIVIDED CALCIUM HYDROXIDE

The present invention relates to a method and apparatus according to the preambles of the independent claims presented below for preparation of finely divided calcium hydroxide.

Quenching of burnt lime represents very old known technique. Typically the quenching of lime is performed in cisterns by slowly rotating kneaders, wherein water is added slowly in small amounts. Quenching of lime releases considerable amounts of heat. By this method the particle size of the quenched lime, i.e. calcium hydroxide, prepared is typically 5 ... 10 microns.

If one desires to use quenched lime for the preparation of finely divided precipitated calcium carbonate, i.e. PCC, for example for use in paper industry, it is important that the particle size of calcium hydroxide is small, typically in the nano-range, for example 50 ... 500 nm. Additionally it is very important that the PCC prepared is very pure and that it does not contain components decreasing the quality of the end product or impurities that may cause troubles in the paper making process.

The Finnish patent FI 103964 discloses a method where calcium oxide and an excess of water are led into an impact disintegrator operating according to the impact mill principle. The material discharged from the impact disintegrator, namely a water suspension containing calcium hydroxide, is allowed to settle in a cistern, typically for several tens of minutes. The precipitated portion comprises oversized particles derived from over-burnt calcium oxide. Additionally, oversized particles are impurities, especially sand and silicates. All these oversized particles are returned to the impact disintegrator where they are comminuted again. The precipitated material can be returned several times to the impact disintegrator until the material is throughout comminuted enough. Because an excess of water has been fed into the impact disintegrator, the comminuting of the calcium oxide material is weakened due to the dampening effect of the water. Also for this reason the material should be returned to the impact disintegrator.

By the method described above a material with a small particle size is achieved. A problem is, however, in that the impurities (sand and silicates), which are harder than calcium oxide, also finally are comminuted into small particles due to the repeated return of the precipitated material into the impact disintegrator. Thus the end product, the calcium hydroxide, will comprise these impurities. Irrespective of the intended use of the calcium hydroxide prepared, these impurities cause damages in pumps and other process equipments. Especially when aimed for preparation of PCC for use in paper industry, this is particularly problematic because silicates and sand cause easily damages to the paper calenders.

OBJECTS AND SUMMARY OF THE INVENTION

An object of the present invention is a method for preparation of calcium hydroxide resulting in calcium hydroxide of a very small particle size, preferably in the nano-range, especially in the range 50 ... 500 nm, and where additionally the calcium hydroxide obtained is very pure, i.e. above all free of hard impurities such as sand and silicates. The aim is to achieve a mixture of fine, especially nano-ranged particles of calcium hydroxide so that the particles are as equal in size as possible. It has been observed that an aqueous mixture (lime milk) of calcium hydroxide particles equal in size is stable and the particles will not easily start to grow and precipitate.

Now it has surprisingly been found that disintegrating the calcium oxide into fine particles in an impact disintegrator and subsequently performing the quenching of the calcium oxide particles in two steps, give a calcium hydroxide with a small and even-sized particle size which further is pure, especially free from sand and silicates.

The method according to the invention is characterized in that calcium oxide is comminuted to a particle size <20 mm, preferably <1 mm, in an impact disintegrator into which in addition to the calcium hydroxide a small amount of water is led to wet the particles obtained and to bind the dust, and that the calcium oxide powder obtained is led to a conveyor being in connection with the impact disintegrator and operating as a pre-quencher, to which conveyer water is added and where the material is subjected to a kneading effect, and that the material which is a mixture of calcium oxide and calcium hydroxide is led from the conveyor to a cistern operating as post-quencher, to which cistern the remaining portion of the total water amount required for quenching is added, and that the amount of water added to the impact disintegrator and to the pre-quencher is altogether 20 ... 50% of the total amount of water required for quenching, preferably about ⅓ of the total amount of water required for quenching, and the amount of water added to the post-quencher is 80 ... 50% of the total amount of water required for quenching, preferably about ⅔ of the total amount of water required for quenching.

DETAILED DESCRIPTION OF THE INVENTION

Figure 1:
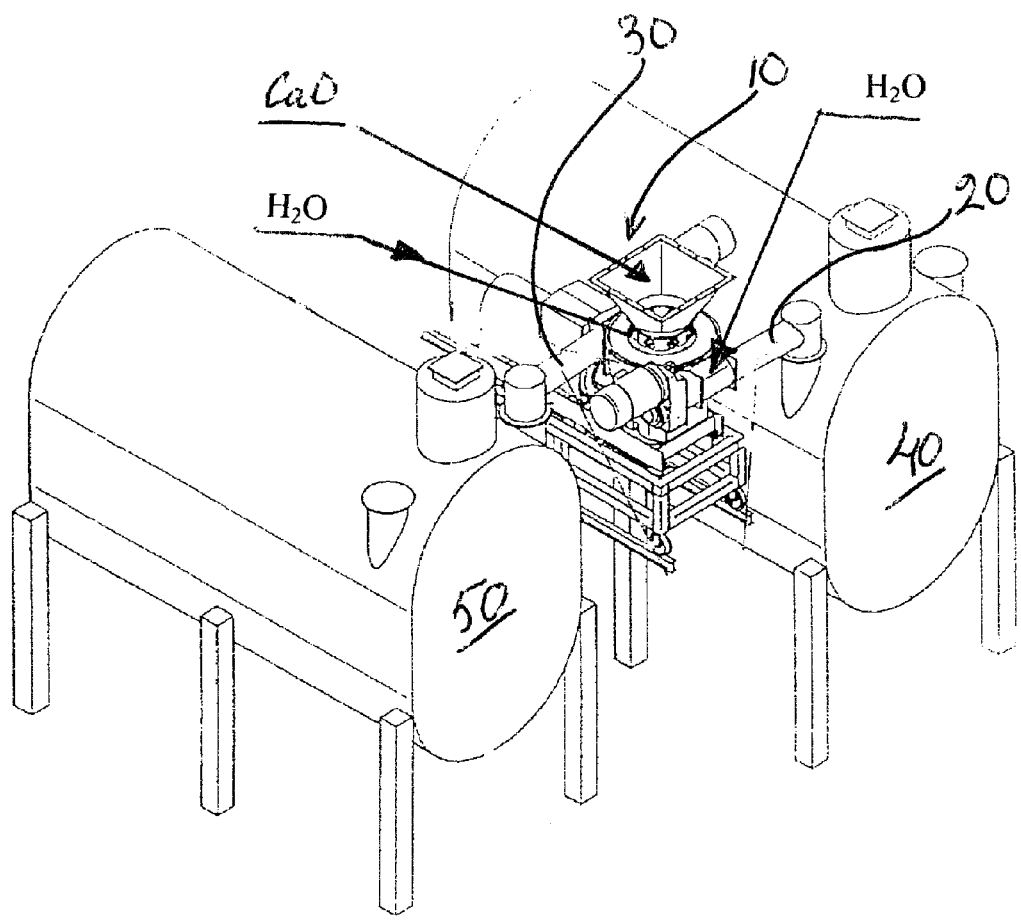
FIG. 1 shows in one embodiment an apparatus to be used in the method according to the invention.

The comminuting of the calcium oxide is carried out in the impact disintegrator. In this step, a lot of fine, pulverulent material is formed, the removal of which afterwards would be troublesome and expensive. Therefore a small amount of water is fed to this step in order to bind the dust. The surfaces of the finely divided particles obtained are wetted with water, and therefore they react easily with water in the subsequent step, i.e. the so-called pre-quenching step.

The impact effect of the impact disintegrator must be hard enough to comminute the burnt lime, i.e. calcium oxide, preferably so that also over-burnt calcium oxide is comminuted. However, the impact effect shall not be so vigorous that also sand and silicates are comminuted and consequently would enter into the end product.

If the impact disintegrator is an apparatus operating according to the impact mill principle having a rotor portion to be presented more in detail below, then it is preferable that the impact speed between the blade of the outermost ring on the rotor of the impact disintegrator and the calcium oxide particles is less than 80 m/s, preferably about 40 m/s. In this way it is secured that calcium oxide particles of a desired size are obtained and that hard impurities remain non-comminuted.

The quenching process is carried out in two steps: pre-quenching and post-quenching.

The reaction of burnt lime, i.e. CaO with water, is of two kinds:
1. A rapid ion reaction, i.e. $CaO \rightarrow Ca^{2+}+O^{2-}$
2. A slow covalent reaction (ionization of water), i.e. $H_2O \rightarrow 2H^{+}+O^{2-}$ According to the Pauling's electro-negativity theory, 71% of CaO reacts according to the rapid ion reaction and 29% according to the slow covalent reaction. Therefore it was decided to perform the quenching in two steps. Thus the total time required for quenching will become as short as possible. A short quenching time is necessary in order to retain the small size of the calcium hydroxide particles.

The pre-quenching step is preferably carried out in a conveyor, typically a screw conveyor, by which the finely comminuted calcium oxide, the particle surfaces of which are wetted, is transported away from the impact disintegrator. Into this pre-quencher is led water so that the amount of water added to the impact disintegrator and to the pre-quencher together is 20 . . . 50% of the total amount of water required for quenching, preferably about ⅓ of the total amount of water required for quenching. The remaining portion of the required water amount is added to the post-quencher.

In the conveyor a kneading effect is subjected to the paste-like material therein, wherein the material is a mixture of calcium oxide and calcium hydroxide. Especially in case the conveyor is a screw conveyor, the kneading effect on the material is caused by the propulsive force of the screw. Also the construction of the screw can increase the kneading effect, for example by reducing the pitch of the screw towards the discharge end of the conveyor. The kneading effect increases the contact between the components participating in the reaction and removes the calcium hydroxide formed on the surface of the calcium oxide, which allows the water to efficiently react with calcium oxide. Due to addition of water the temperature rises fast. The increase of the temperature accelerates the quenching time: for every temperature increase of 10° C., the reaction speed doubles. Because of the temperature increase and the compression caused in the conveyor, a slight overpressure is created in the conveyor.

From the conveyor, preferably from its feeding end, air can be removed, if desired, to further intensify the reaction.

The material is transported from the conveyor operating as pre-quencher to the post-quencher. The post-quenching is preferably carried out in a cistern which is typically a blade agitator. Into the post-quencher is led water in an amount which is 80 . . . 50% of the total amount of water required for quenching, preferably about ⅔ of the total amount of water required for quenching.

The heavy particles of impurities are separated from the post-quencher before the end product, calcium hydroxide, is recovered. The separated impurities are removed from the process, i.e. they are not recycled to the impact disintegrator for comminuting. In this way the purity of the end product is safeguarded.

The delay of the material in the apparatus is typically as follows: in the impact disintegrator less than 0.01 s; in the conveyor less than 30 s and in the post-quencher less than 200 s. Thus the total delay is only about 4 minutes.

According to the method of the invention, a lime milk is obtained where the size of the calcium hydroxide particles is less than 200 nm, which contains very small amounts of impurities and which may have a solids content of about 20%.

FIG. 1 shows in one embodiment an apparatus to be used in the method according to the invention. Into the impact mixer 10 is fed calcium oxide, the size of which typically varies from 100 mm to dust-like, and which usually contains great amounts of impurities such as silicates, sand, humus and iron. The impact mixer is an apparatus operating according the impact mill principle, which is illustrated more in detail in FIG. 2. In order to bind dust and to wet the surfaces of the calcium oxide particles obtained, a small amount of water is also fed into the impact mixer 10. The material is removed from the impact mixer by a conveyor (in this case by two conveyors 20 and 30, each of which leading to a separate cistern 40 and 50). The conveyors are preferably screw conveyors (see FIG. 2). Water is led to the conveyors which operate as pre-quenchers. The remaining portion of the total amount of water required for quenching is led to the cisterns 40 and 50, which operate as post-quenchers. Before the end product is recovered, the heavy impurities are separated from the cisterns 40 and 50, for example by precipitating. The separated impurities are removed from the process.

Figure 2:
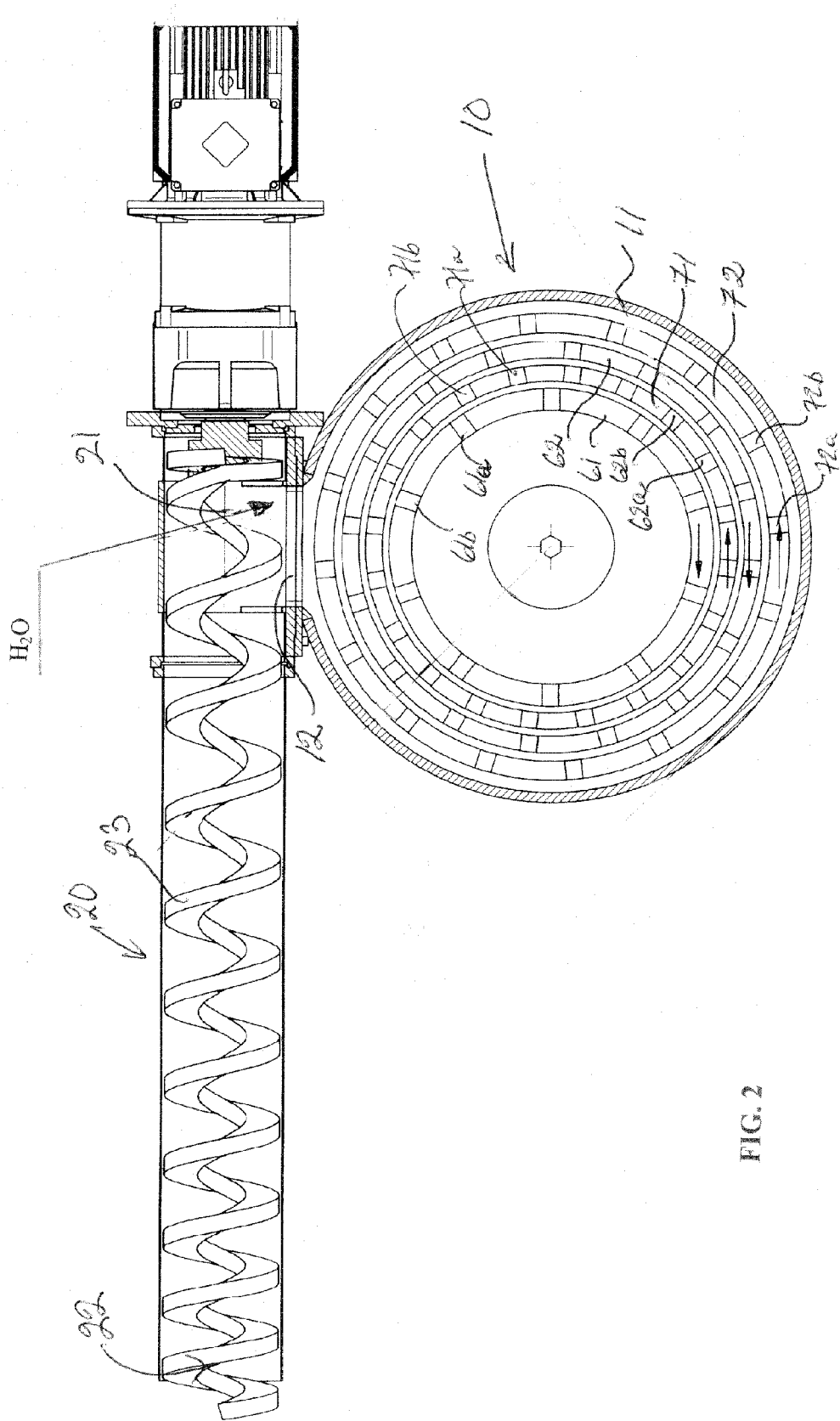
FIG. 2 shows the impact disintegrator shown in FIG. 1 and a screw conveyor connected thereto in a horizontal cross-section.

FIG. 2 shows, in a horizontal cross section, an impact disintegrator operating according to the principle of an impact mill and a screw conveyor connected thereto. Apparatuses operating according to the impact mill principle are as such well known. They are previously described in a great number of patents, for example in the Finnish patent publications FI 94030 B, FI 105112 B and FI 105699 B and the PCT publication WO 96/18454. The patent FI 117711 also discloses an apparatus operating according to the impact mill principle, where the apparatus is connected to a discharge screw for the material treated in the apparatus.

In this figure the impact mixer 10 comprises two rotors. The coaxial rotors 60 and 70 comprise blade rings 61, 62 and 71, 72 which are arranged in an intermeshed fashion so that the rings 61 and 62 are located in an upper rotor 60 and the rings 71 and 72 are located in a lower rotor 70. The blade rings comprise blades 61a, 61b, . . . 71a, 71b, . . . etc. according to technique known per se. The figure shows more in detail how the adjacent blade rings 61,71 . . . , equipped with blades 61a, 61b, . . . and 71a, 71b . . . rotate in opposite directions as shown by the arrows. The reference number 11 denotes the wall of a housing surrounding the rotors and the reference number 12 denotes the discharge opening for the material treated in the apparatus.

The conveyor 20 connected to the impact disintegrator 10 is according to the figure a screw conveyor. The figure shows that the tightness of the thread of the screw 23 increases (i.e. the pitch decreases) from the feeding end 21 towards its discharge end 22. The material discharged from the impact disintegrator enters the feeding end 21 of the screw, where water required for the pre-quenching is added. The movement of the screw squeezes the paste-like material transported therein and causes a kneading effect on the material. In this way the contact between the components participating in the reactions is enhanced, and calcium hydroxide developed on the surface of the calcium oxide is removed, whereby water is efficiently allowed to react with the calcium oxide. Additionally, the decreasing pitch of the screw towards the discharge end 22 of the conveyer increases the kneading effect on the material moving therein. Due to the temperature increase caused by the pre-quenching and because of the squeezing caused in the screw conveyor, a slight overpressure is created in the screw conveyor. On the contrary, there is a lowered pressure in the impact disintegrator from its center to the wall 11.

If so desired, air can be removed from the feeding end 21 of the conveyor to intensify the reaction.

The discharge end 22 of the screw conveyor 20 is, as shown in FIG. 1, in connection with the post-quencher 40, into which in addition to the material transported by the screw, the water required for the post-quenching is fed.

EXAMPLE

The experiment was carried out in an apparatus of production scale having a quenching capacity 10 ton calcium oxide per hour. The impact disintegrator was an impact mill equipped with two rotors. The impact speed between the blade of the outermost ring on the rotor and the product to be disintegrated (calcium oxide) was 60 m/s. The impact disintegrator was connected to a screw conveyor operating as pre-quencher. The pitch of the screw was 200 mm in the feeding end of the screw conveyor and 100 mm in the discharge end. The pitch of the screw decreased steplessly from the feeding end towards the discharge end. The discharge end of the screw conveyor was connected to a blade agitator operating as post-quencher.

Of the total water amount required for quenching, totally ⅓ was led to the impact disintegrator to wet the powder and to the pre-quencher, and ⅔ of the total water amount required was led to the post-quencher.

The delay of the material was <0.01 s in the impact disintegrator, <30 s in the screw conveyor and <200 s in the post-quencher, i.e. totally about 4 min in the apparatus.

The dry matter content was 10% (fluid) after the impact disintegrator, 20% (paste-like) in the discharge end of the screw conveyor, and 30% (fluid) after the post-quencher.

The particle size of the calcium hydroxide was 50 . . . 70 nm, converted to spherical pieces. The particle size was measured by precipitation in a measuring glass with a volume of 1000 ml and a height of 340 mm. After five hours' precipitation the sediment was 10 mm and its dry matter content was 20%. This corresponds to calcium hydroxide particles of 50 . . . 70 nm in diameter. A reference value was obtained with precipitation of nanoparticles of calcium carbonate.

By use of nitrogen absorption, a diameter of 70 nm was obtained. However, this test method registers also the area of the pores, and therefore the diameter of the spherical particles was about 50 . . . 60 nm.

The invention is not intended to be limited to the exemplified embodiments presented above. On the contrary, the invention shall be broadly interpreted within the scope of the claims presented below.

The invention claimed is:

1. Apparatus for the preparation of finely divided calcium hydroxide by quenching of calcium oxide with water, comprising
   a) an impact disintegrator comprising
      a housing equipped with a feed opening,
      a first rotor fitted inside the housing, equipped with blades with impact surfaces and which form at least one coaxial ring with said rotor,
      a second rotor or stator, fitted inside the housing and being coaxial with the first rotor, wherein the rotor or stator is equipped with blades having impact surfaces which form at least one coaxial ring with said rotor or stator, and which are staggered with the ring of the first rotor, and
      a discharge opening;
   b) a screw conveyor having a feeding end connected to the discharge opening of the impact disintegrator, said screw conveyor equipped to add water to material conveyed therein, and
   c) a cistern connected to a discharge end of said conveyor, said cistern having an agitator and equipped to add water to said material.

2. The apparatus according to claim 1, wherein a tightness of the thread of the screw is arranged to increase towards the discharge end of said screw conveyor so that the ratio between the thread tightness of the screw at the feeding end and the thread tightness of the screw at the discharge end is 1/(1.1-4).

3. The apparatus according to claim 2, wherein said ratio is 1/2.

4. The apparatus according to claim 1, wherein the impact disintegrator is equipped with at least two discharge openings such that each discharge opening is connected to a screw conveyor and each screw conveyor leads to a separate cistern.

5. The apparatus according to claim 1, wherein said cistern comprises a blade agitator.

6. The apparatus according to claim 1, wherein each rotor has at least two coaxial rings.

7. The apparatus according to claim 1, wherein said cistern is equipped to separate impurities before calcium hydroxide is recovered.

* * * * *